(12) United States Patent
Irie et al.

(10) Patent No.: US 11,262,784 B2
(45) Date of Patent: Mar. 1, 2022

(54) RESIN PEDAL ARM

(71) Applicant: TOYODA IRON WORKS CO., LTD., Aichi (JP)

(72) Inventors: Yoshihiro Irie, Aichi (JP); Takumi Uno, Aichi (JP); Hideaki Sakai, Aichi (JP); Yoshinobu Fukatsu, Aichi (JP); Yoshihiko Mori, Aichi (JP)

(73) Assignee: TOYODA IRON WORKS CO., LTD., Aichi (JP)

( * ) Notice: Subject to any disclaimer, the term of this patent is extended or adjusted under 35 U.S.C. 154(b) by 0 days.

(21) Appl. No.: 17/277,870

(22) PCT Filed: Jul. 26, 2019

(86) PCT No.: PCT/JP2019/029357
§ 371 (c)(1),
(2) Date: Mar. 19, 2021

(87) PCT Pub. No.: WO2020/059300
PCT Pub. Date: Mar. 26, 2020

(65) Prior Publication Data
US 2021/0349492 A1 Nov. 11, 2021

(30) Foreign Application Priority Data
Sep. 21, 2018 (JP) .............................. JP2018-176879

(51) Int. Cl.
*G05G 1/30* (2008.04)
*G05G 1/50* (2008.04)
(Continued)

(52) U.S. Cl.
CPC .............. *G05G 1/506* (2013.01); *B60K 23/02* (2013.01); *B60K 26/02* (2013.01); *B60T 7/04* (2013.01)

(58) Field of Classification Search
CPC ............ G05G 1/506; G05G 1/50; G05G 1/30; G05G 1/44; G05G 1/445; B60T 7/04; B60T 7/06; B60K 26/02
See application file for complete search history.

(56) References Cited

U.S. PATENT DOCUMENTS 5,074,163 A * 12/1991 Baumann ............... G05G 1/506
74/512
5,575,181 A   11/1996 Baumann
(Continued)

FOREIGN PATENT DOCUMENTS

CN   202038298 U   11/2011
CN   204095787 U    1/2015
(Continued)

OTHER PUBLICATIONS

International Search Report dated Sep. 10, 2019 issued in Patent Application No. PCT/JP2019/029357.
(Continued)

*Primary Examiner* — Richard W Ridley
*Assistant Examiner* — Brian J Mcgovern
(74) *Attorney, Agent, or Firm* — Pearne & Gordon LLP

(57) ABSTRACT

Provided is a resin pedal arm of which strength is further improved. A resin pedal arm 10 includes a hollow arm body 20. The arm body 20 includes a front wall portion 30, a rear wall portion 32 facing the front wall portion 30, a left wall portion 34 formed between left edges 30A, 32A of the front wall portion 30 and the rear wall portion 32 and having multiple first flat plate portions 38 arranged to bridge between the left edges 30A, 32A, and a right wall portion 36 formed between right edges 30B, 32B of the front wall portion 30 and the rear wall portion 32, having multiple second flat plate portions 40 arranged to bridge between the right edges 30B, 32B, and facing the left wall portion 34. The multiple second flat plate portions 40 are each present (Continued)

in multiple left opening areas S1 each provided between adjacent ones of the multiple first flat plate portions 38, as viewed in a direction in which the left wall portion 34 and the right wall portion 36 face each other.

4 Claims, 17 Drawing Sheets

(51) Int. Cl.
*B60T 7/04* (2006.01)
*B60K 26/02* (2006.01)
*B60K 23/02* (2006.01)

(56) References Cited

U.S. PATENT DOCUMENTS

| 2014/0076095 | A1 | 3/2014 | Hemmege Venkatappa et al. |
| 2015/0033905 | A1* | 2/2015 | Hoffmann ............. G05G 1/506 74/560 |
| 2016/0039460 | A1 | 2/2016 | Watanabe |
| 2017/0106838 | A1* | 4/2017 | Rieskamp ............. B60K 23/02 |

FOREIGN PATENT DOCUMENTS

| CN | 104960420 A | 10/2015 |
| CN | 206049636 U | 3/2017 |
| EP | 2 921 927 A2 | 9/2015 |
| EP | 2 921 927 B1 | 8/2017 |
| JP | S57-14226 U | 1/1982 |
| JP | H08-221145 A | 8/1996 |
| JP | 2001-184135 A | 7/2001 |
| JP | 2004-013186 A | 1/2004 |
| JP | 2005-316539 A | 11/2005 |
| JP | 2016-038722 A | 3/2016 |
| JP | 2017-084209 A | 5/2017 |
| WO | 2018-003038 A1 | 1/2018 |

OTHER PUBLICATIONS

Office Action dated Dec. 14, 2021 for the corresponding Chinese Patent Application No. 201980060907.8.

* cited by examiner

FIG. 5
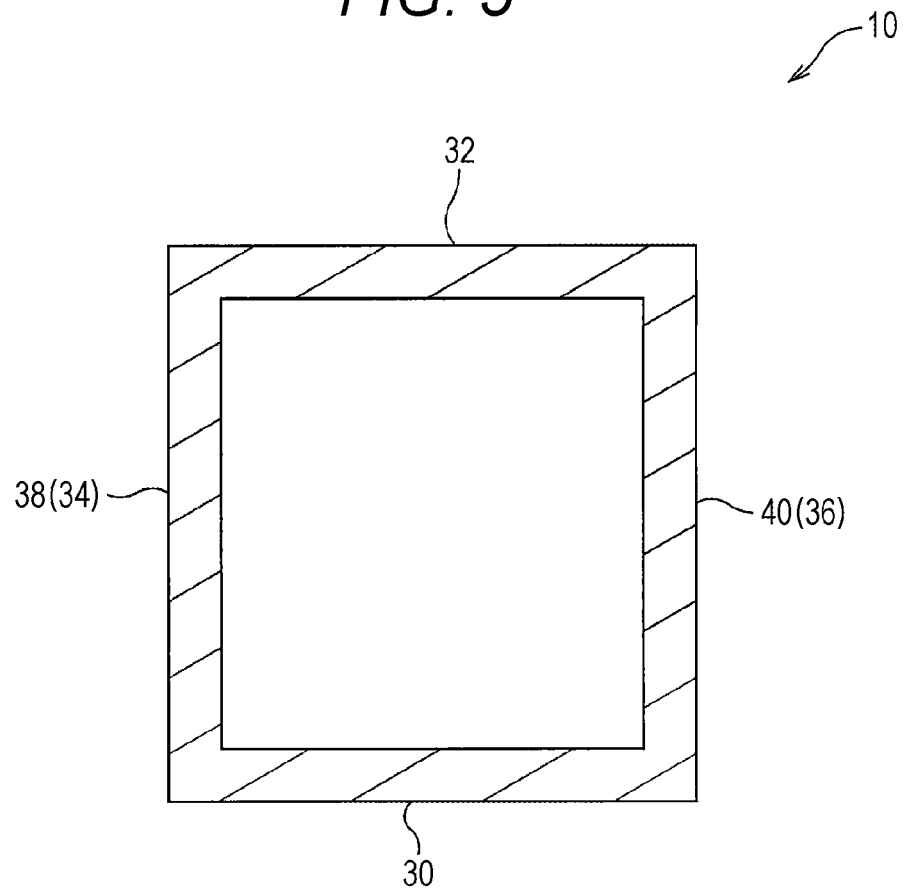
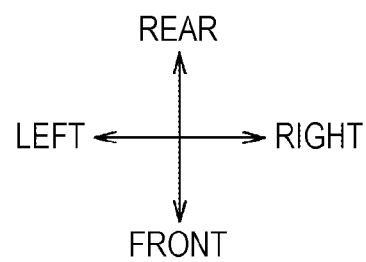

FIG. 10
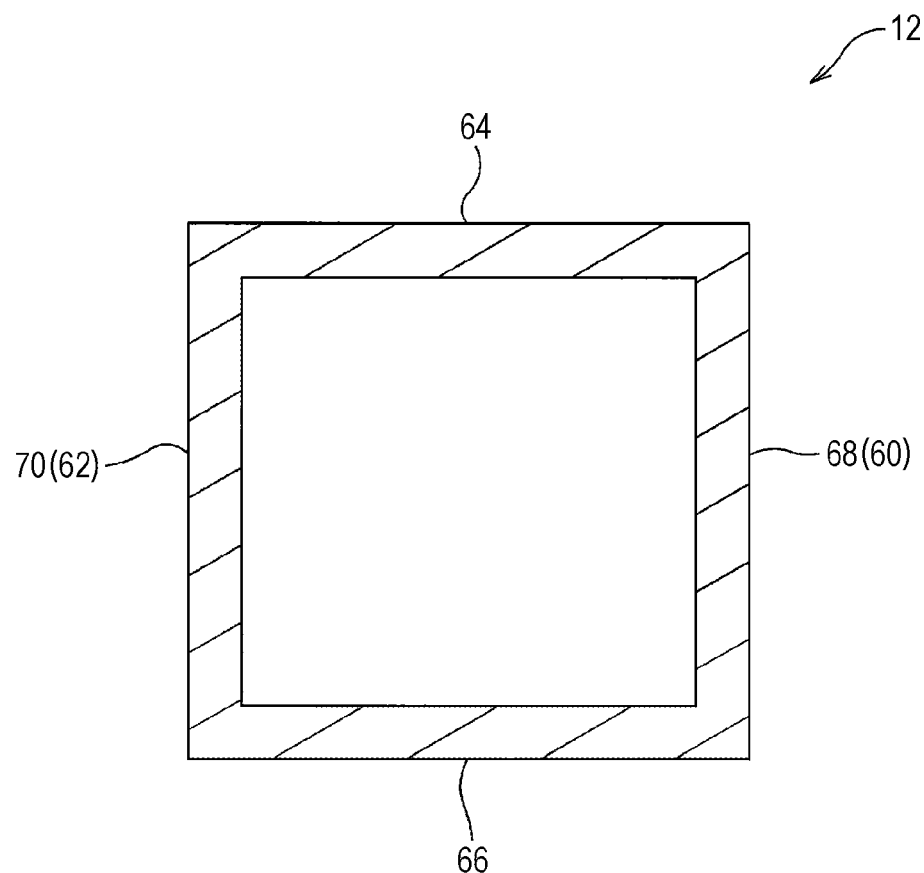
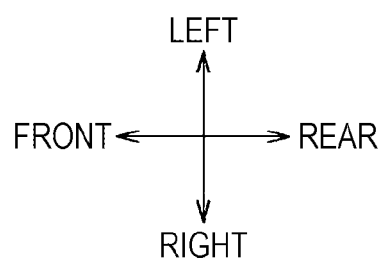

FIG. 17
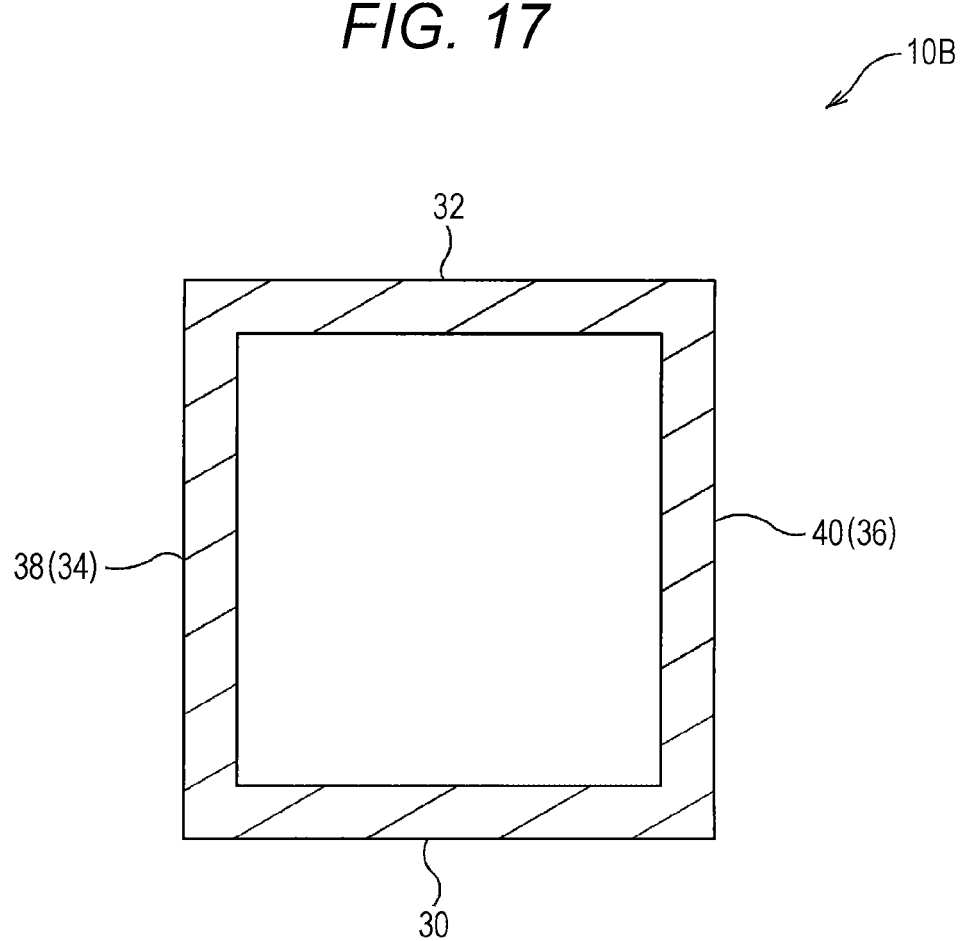
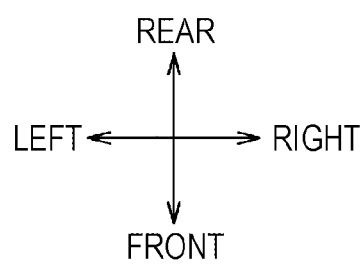

RESIN PEDAL ARM

TECHNICAL FIELD

The present embodiment relates to a resin pedal arm.

BACKGROUND ART

Typically, various techniques have been proposed for a resin pedal arm. For example, a technique described in Patent Literature 1 is characterized in that an operation pedal turnably supported on a vehicle-body-side member of a vehicle includes an arm portion extending in a longitudinal direction from a base end portion as the center of rotation to a tip end portion to which operation force is applied and the arm portion includes a core formed in a hollow pipe shape and a reinforcing rib provided along a longitudinal direction of the core.

With such a feature, the arm portion includes, according to the technique described in Patent Literature 1 below, the core formed in the hollow pipe shape and the reinforcing rib is provided along the outer periphery of the core, and therefore, required strength can be ensured while weight reduction can be realized and cost reduction can be also realized.

Moreover, in a technique described in Patent Literature 2, a pedal arm to be attached to a vehicle includes an arm body having a front wall, a rear wall, a left wall, and a right wall corresponding to front-rear and right-left directions of the vehicle and formed as an integrally-molded article on which multiple ribs stand, a tread portion provided at a lower end portion of the arm body, a first hole penetrating the arm body in the right-left direction of the vehicle such that a first shaft fixed to a vehicle body side is insertable into the first hole, and a second hole penetrating the arm body in the right-left direction of the vehicle such that a second shaft connected to a control system of the vehicle is insertable into the second hole. The arm body further has a first curved portion curving in a backward direction of the vehicle as the arm body extends downward of the vehicle. The rear wall of the arm body formed continuously downward of the first curved portion is arranged on a lower side of the vehicle with respect to a first line connecting the tread portion and the first hole and a second line connecting the tread portion and the second hole. The multiple ribs include, at at least one of the left wall or the right wall, first ribs extending on the first line as laterally viewed to connect the first hole and a rear-wall-side peripheral edge portion of at least one of the left wall or the right wall at the arm body formed continuously upward of the first curved portion, and second ribs extending on the second line as laterally viewed to connect the second hole and the rear-wall-side peripheral edge portion of at least one of the left wall or the right wall at the arm body formed continuously upward of the first curved portion.

In the technique described in Patent Literature 2 below, the multiple ribs standing on the arm body have, at at least one of the left wall or the right wall of the arm body, the first ribs extending on the first line connecting the tread portion and the first hole as laterally viewed to connect the first hole into which the first shaft fixed to the vehicle side is insertable and the rear-wall-side peripheral edge portion of at least one of the left wall or the right wall formed continuously upward of the first curved portion curved in the backward direction of the vehicle as the arm body extends downward of the vehicle, and the second ribs extending on the second line connecting the tread portion and the second hole as laterally viewed to connect the second hole into which the second shaft connected to the control system of the vehicle is insertable and the rear-wall-side peripheral edge portion of at least one of the left wall or the right wall formed continuously upward of the first curved portion. With such a feature, a vehicle pedal arm capable of realizing, with the minimum number of ribs, weight reduction while stress generated due to reactive force of stepping force is effectively reduced can be realized.

CITATION LIST

Patent Literature

PATENT LITERATURE 1: WO 2018/003038 A
PATENT LITERATURE 2: JP-A-2016-038722

SUMMARY OF INVENTION

Problems to be Solved by Invention

However, there has been room for improvement in arrangement of the ribs as reinforcing members in each of the techniques described in Patent Literatures 1 and 2 above in terms of strength improvement.

Thus, the present embodiment has been made in view of the above-described points, and is intended to provide a resin pedal arm of which strength is further improved.

Solution to Problems

In order to address the problem described above, an embodiment according to claim 1 is a resin pedal arm which includes a hollow arm body, the arm body including: a first wall portion; a second wall portion facing the first wall portion; a third wall portion formed between first edges of the first wall portion and the second wall portion and having multiple first flat plate portions arranged to bridge between the first edges; and a fourth wall portion formed between second edges of the first wall portion and the second wall portion, having multiple second flat plate portions arranged to bridge between the second edges, and facing the third wall portion, and the multiple second flat plate portions are each present in multiple opening areas each provided between adjacent ones of the multiple first flat plate portions, as viewed in a direction in which the third wall portion and the fourth wall portion face each other.

An embodiment according to claim 2 is the resin pedal arm according to claim 1, further including: a tread portion provided at the arm body and stepped on in a forward direction of a vehicle to which the arm body is attached, in which the tread portion, the first wall portion, and the second wall portion are parallel with a vehicle width direction of the vehicle.

An embodiment according to claim 3 is the resin pedal arm according to claim 1 or 2, in which the multiple first flat plate portions and the multiple second flat plate portions are provided in a predetermined region of the third wall portion and the fourth wall portion.

Effects of Invention

In the resin pedal arm of the present embodiment, the strength can be further improved.

BRIEF DESCRIPTION OF DRAWINGS

FIG. 5 is a sectional view of the resin pedal arm along a line A-A of FIG. 4.

FIG. 10 is a sectional view of the resin pedal arm along a line B-B of FIG. 8.

FIG. 17 is a sectional view of the resin pedal alai along a line C-C of FIG. 16.

DESCRIPTION OF EMBODIMENTS

Hereinafter, a resin pedal arm according to the present embodiment will be described with reference to the drawings based on each specific embodiment. In each embodiment, the resin pedal arm according to the present embodiment is a resin molded article manufactured by injection molding of molten resin, and is attached to a vehicle (not shown) and is used as a brake pedal. Note that the resin pedal arm may be used as a vehicle pedal (e.g., an accelerator pedal or a clutch pedal) other than the brake pedal. Note that in description below, the vehicle to which the resin pedal arm according to the present embodiment is attached will be abbreviated as a vehicle.

Figure 1:
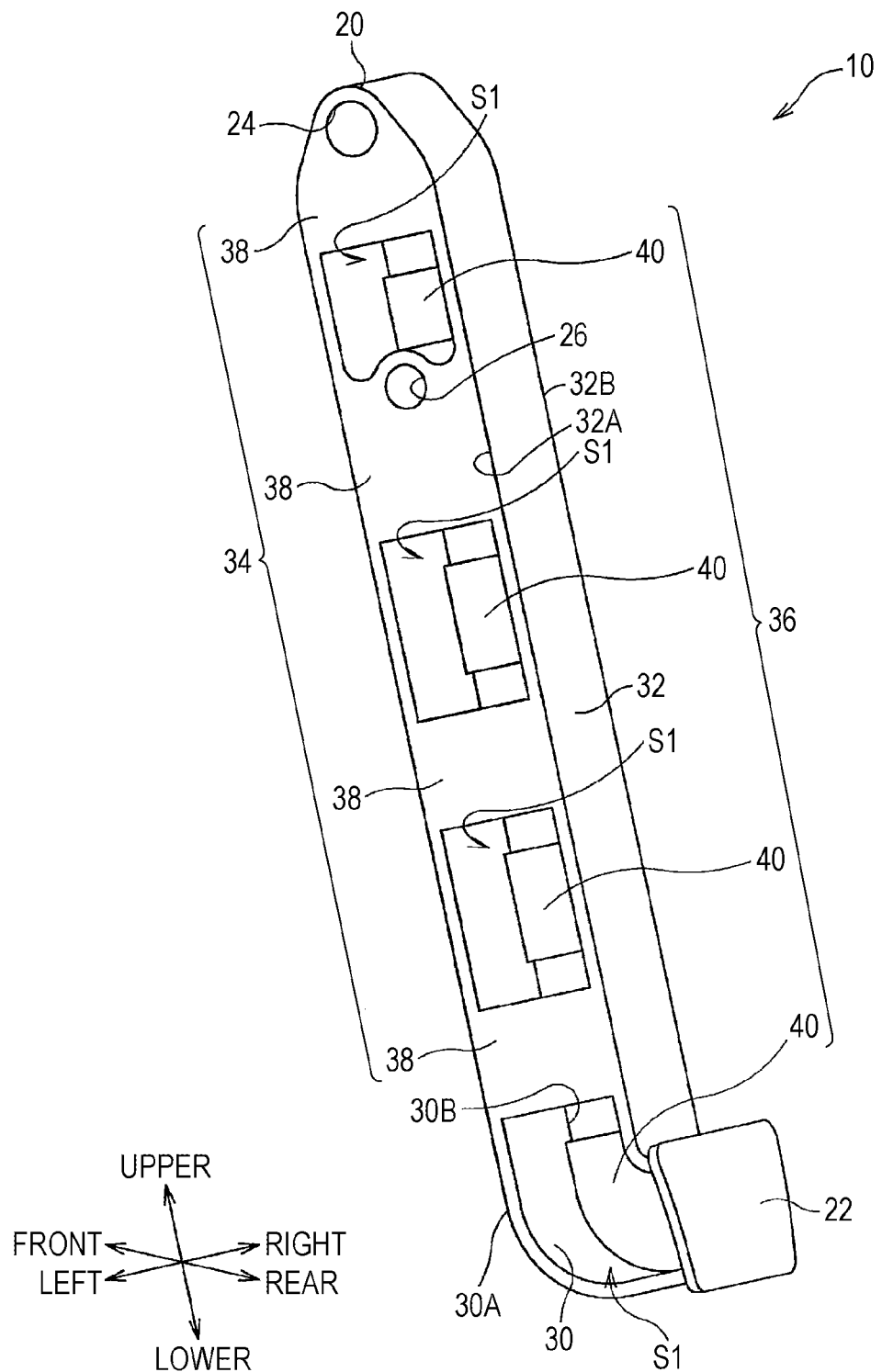
FIG. 1 is a perspective view of a resin pedal arm of a first embodiment.
Figure 2:
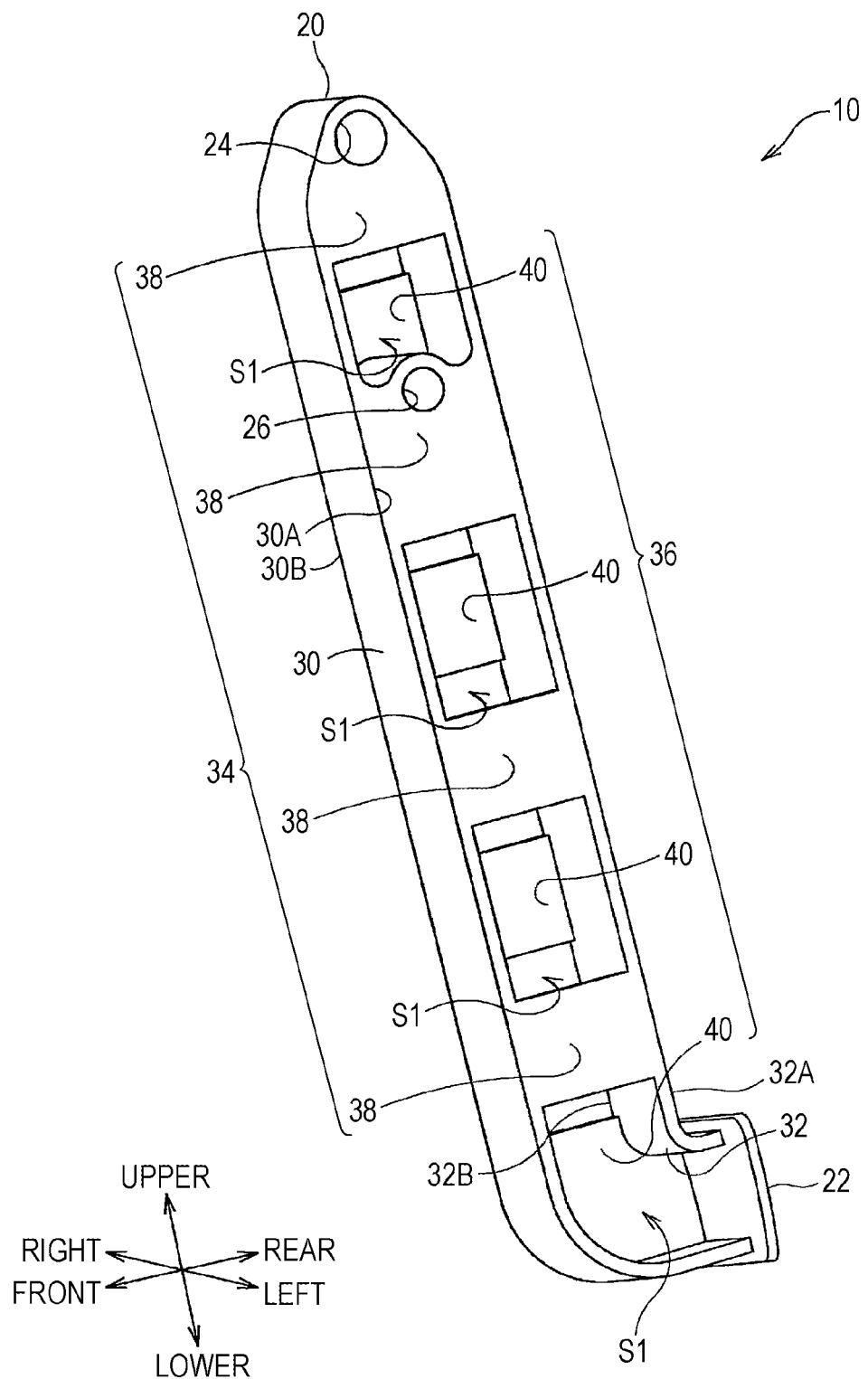
FIG. 2 is a perspective view of the resin pedal arm.
Figure 3:
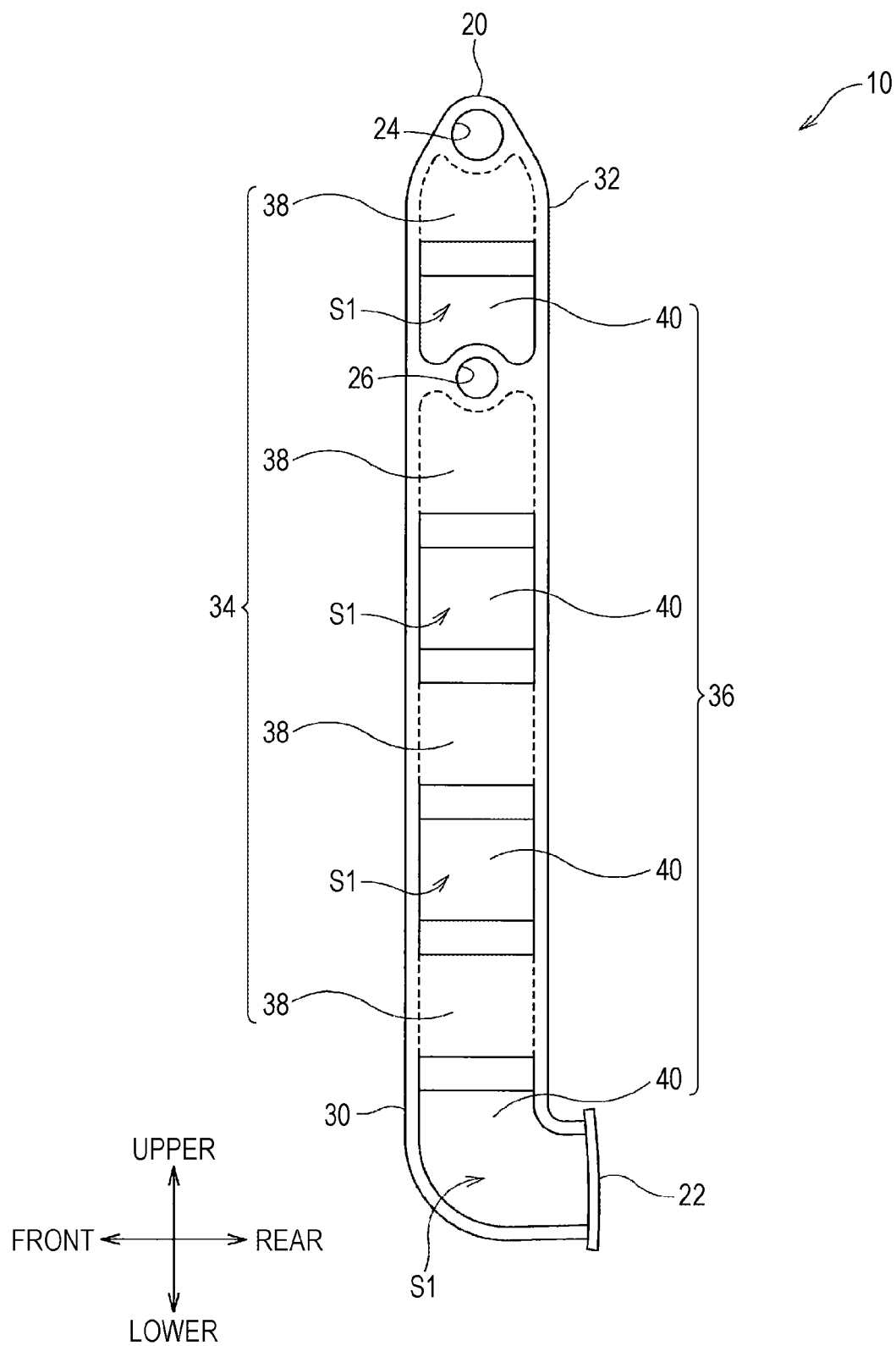
FIG. 3 is a side view of the resin pedal arm.
Figure 8:
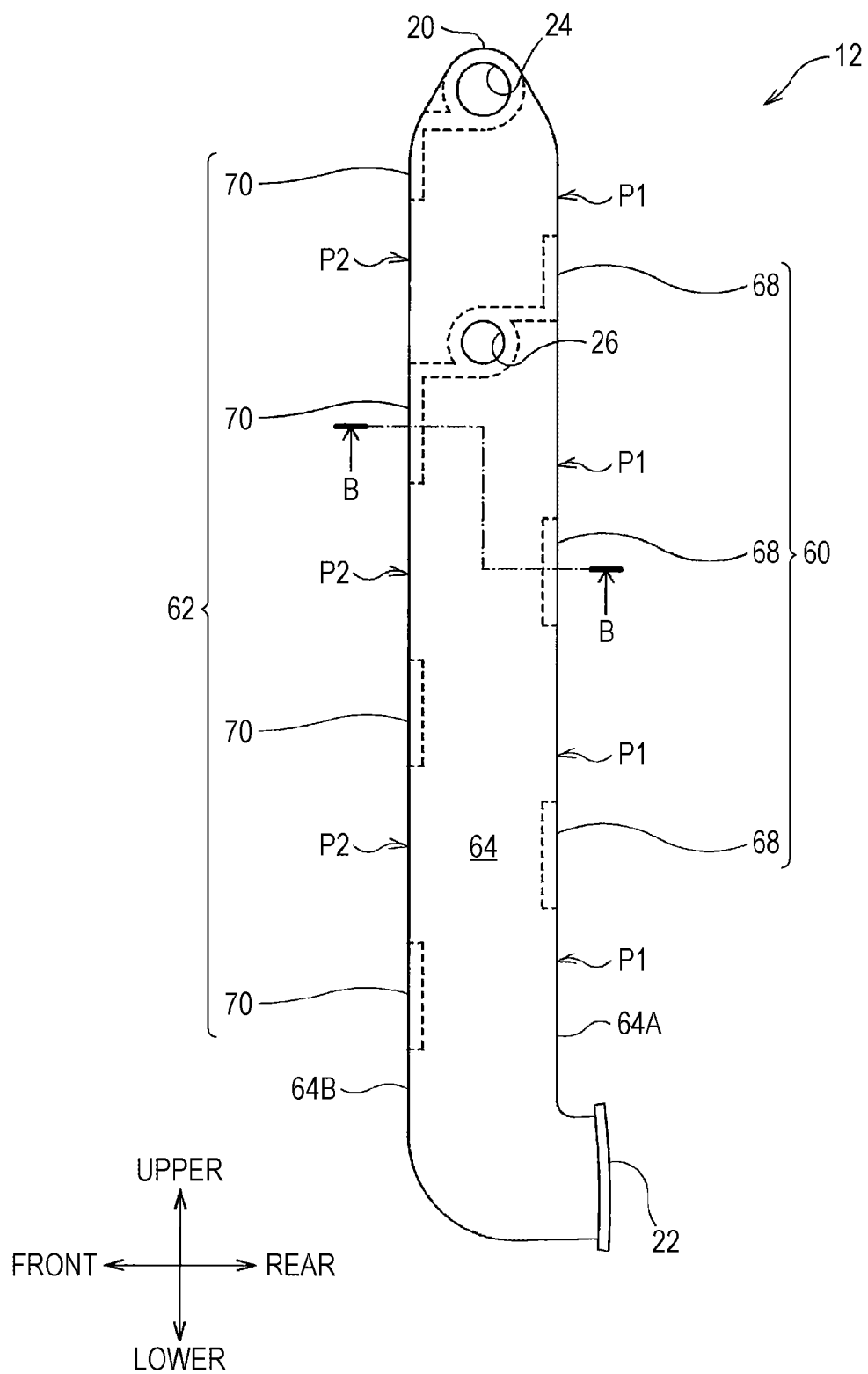
FIG. 8 is a side view of the resin pedal arm.
Figure 9:
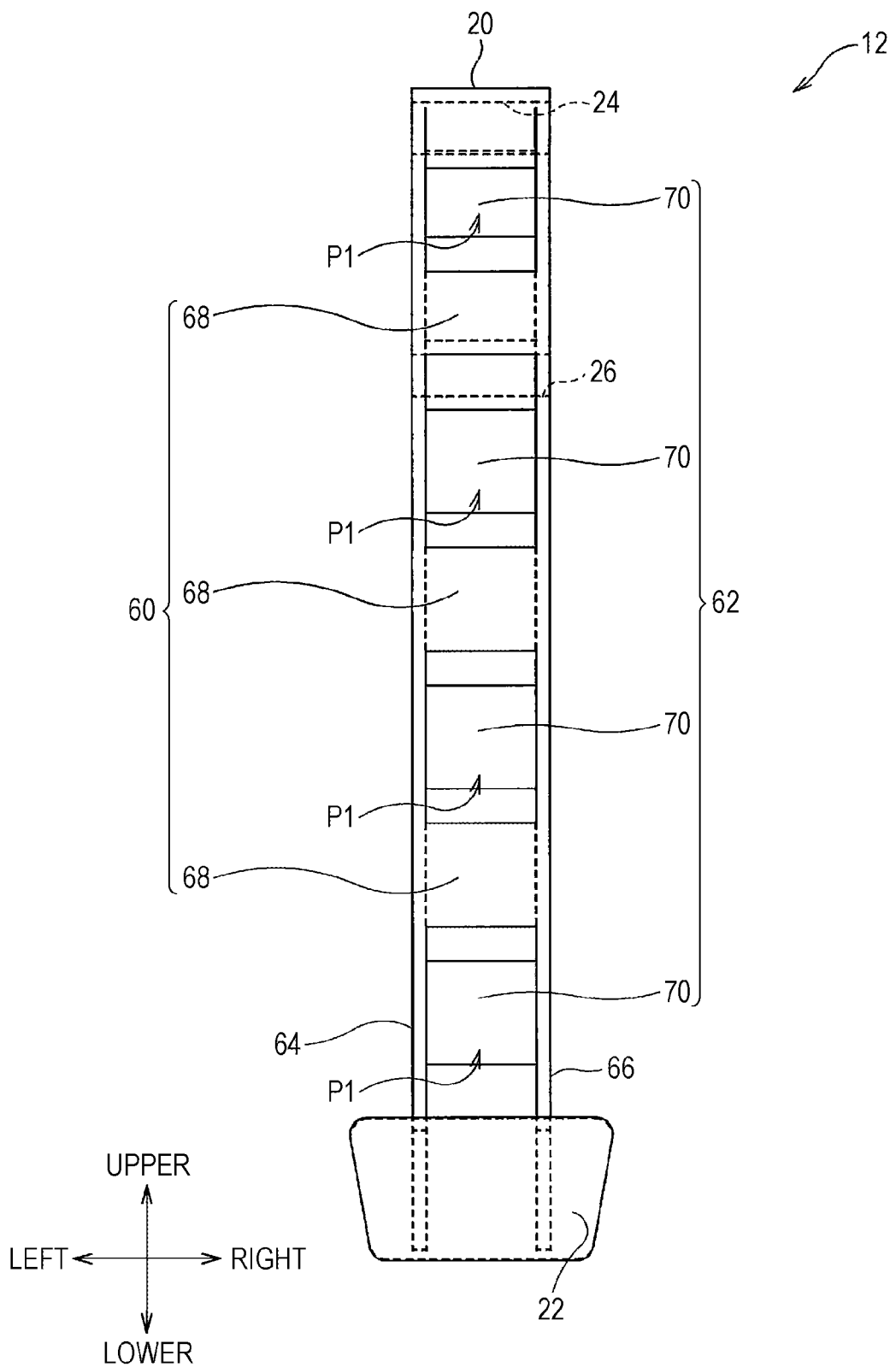
FIG. 9 is a front view of the resin pedal arm.
Figure 15:
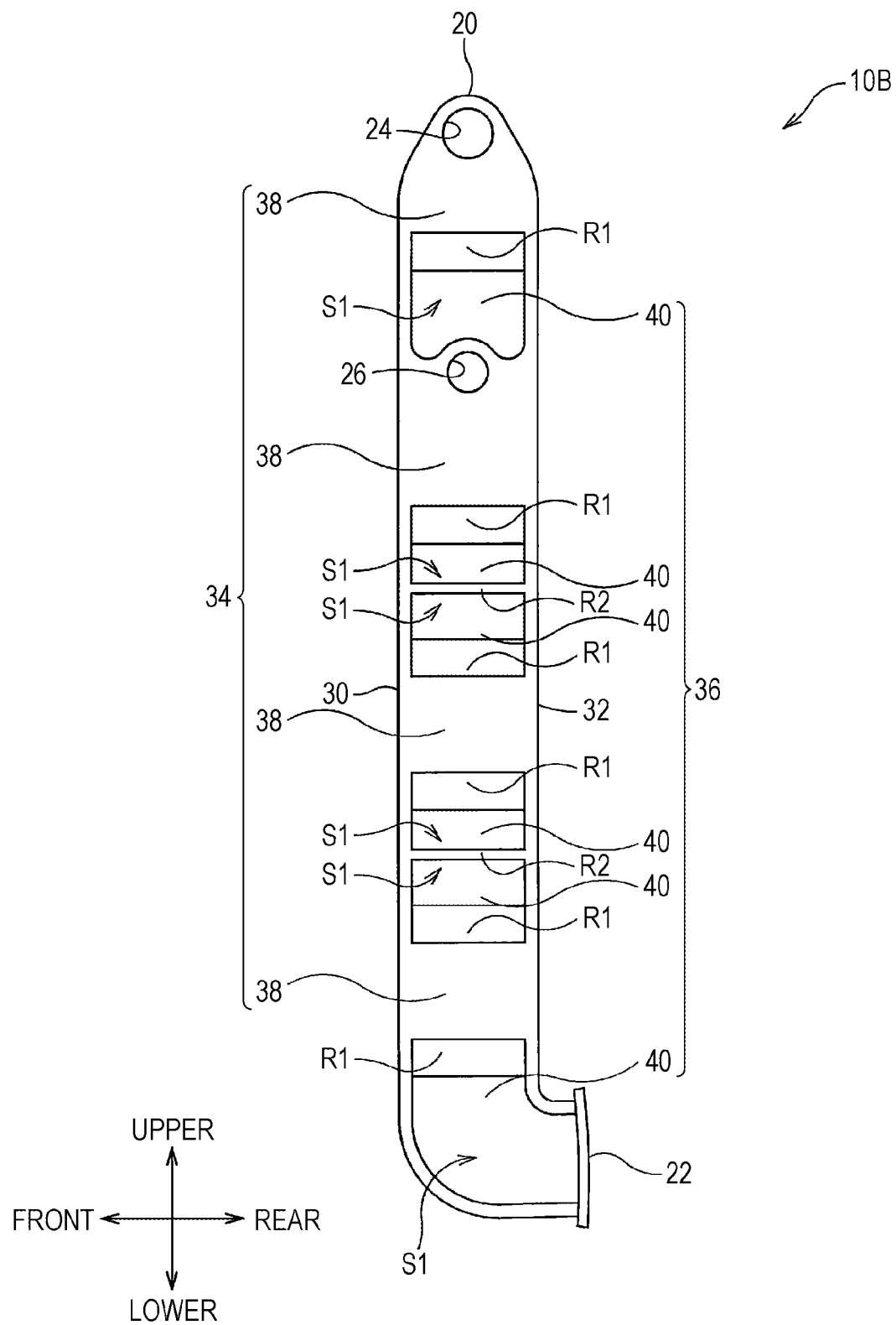
FIG. 15 is a side view of the resin pedal arm.

In each drawing used for description below, part of a basic configuration is omitted in an illustration, and the dimensions and the like of each component are not precisely illustrated. Moreover, directions in each figure are as illustrated in each figure. Note that in each of side views of FIGS. 3, 8, and 15, a direction from the plane of paper to a far side is a rightward direction, and a direction from the plane of paper to a near side is a leftward direction. That is, a direction perpendicular to the plane of paper of each of FIGS. 3, 8, and 15 is a right-left direction. In each of front views of FIGS. 4, 9, and 16, a direction from the plane of paper to a far side is a forward direction, and a direction from the plane of paper to a near side is a backward direction. In each of sectional views of FIGS. 5, 10, and 17, a direction from the plane of paper to a far side is an upward direction, and a direction from the plane of paper to a near side is a downward direction.

Note that the right-left direction is coincident with a width direction of the resin pedal arm according to the present embodiment and a width direction (hereinafter referred to as a "vehicle width direction") of the vehicle. Moreover, in description below, the width direction of the resin pedal arm according to the present embodiment will be sometimes expressed as the vehicle width direction.

(1) First Embodiment

First, a specific first embodiment of the present embodiment will be described. As illustrated in FIGS. 1 to 4, a resin pedal arm 10 of the first embodiment has an arm body 20 and a tread portion 22. The shape of the arm body 20 is a hollow shape. Details thereof will be described later. The tread portion 22 includes, e.g., a flat surface parallel with the vehicle width direction, and is provided on a rear side of a lower end portion of the arm body 20.

A boss 24 and a clevis attachment hole 26 are provided at an upper end portion of the arm body 20. The boss 24 and the clevis attachment hole 26 have cylindrical shapes of which center axes are parallel with the vehicle width direction.

A pivot pin (not shown) is inserted into the boss 24. Thus, the center of the boss 24 is the center of rotation of the arm body 20 when a driver of the vehicle steps on the tread portion 22 in the forward direction. A clevis pin (not shown) is inserted into the clevis attachment hole 26. Note that a clevis is for turnably coupling a tip end portion of an operating rod (not shown) extending from a brake booster (not shown) of the vehicle to the arm body 20.

The arm body 20 has a front wall portion 30, a rear wall portion 32, a left wall portion 34, and a right wall portion 36. The front wall portion 30 and the rear wall portion 32 are parallel with the vehicle width direction. Thus, the front wall portion 30 and the rear wall portion 32 face each other in a front-rear direction. Each of lower end portions of the front wall portion 30 and the rear wall portion 32 is in a shape bent to the backward direction, and is continuous to the tread portion 22. On the other hand, each of upper end portions of the front wall portion 30 and the rear wall portion 32 is, above the boss 24, continuous to each other in a curved form.

The left wall portion 34 includes, e.g., multiple first flat plate portions 38. The multiple first flat plate portions 38 are, between a left edge 30A of the front wall portion 30 and a left edge 32A of the rear wall portion 32, arranged next to each other in a longitudinal direction of the arm body 20 in a state in which the multiple first flat plate portions 38 are continuous to the front wall portion 30 and the rear wall portion 32. Thus, each of multiple left opening areas S1 is formed between adjacent ones of the multiple first flat plate portions 38. Note that the lowermost left opening area S1 of the multiple left opening areas S1 is formed between the first flat plate portion 38 and the tread portion 22.

The right wall portion 36 includes, e.g., multiple second flat plate portions 40. The multiple second flat plate portions 40 are, between a right edge 30B of the front wall portion 30 and a right edge 32B of the rear wall portion 32, arranged next to each other in the longitudinal direction of the arm body 20 in a state in which the multiple second flat plate portions 40 are continuous to the front wall portion 30 and the rear wall portion 32. Thus, each of multiple right opening areas S2 is formed between adjacent ones of the multiple second flat plate portions 40. Note that the uppermost right opening area S2 of the multiple right opening areas S2 is formed between the second flat plate portion 40 and the boss 24.

The left wall portion 34 and the right wall portion 36 face each other in the right-left direction. Thus, circular openings of each of the boss 24 and the clevis attachment hole 26 are provided at the left wall portion 34 and the right wall portion 36.

At the left wall portion 34 and the right wall portion 36, the multiple first flat plate portions 38 and the multiple second flat plate portions 40 are alternately arranged in the longitudinal direction of the arm body 20. The multiple second flat plate portions 40 are each present in the multiple left opening areas S1 as viewed from the side of the left wall portion 34 (i.e., as viewed in the right-left direction in which the left wall portion 34 and the right wall portion 36 face each other). On the other hand, the multiple first flat plate portions 38 are each present in the multiple right opening areas S2 as viewed from the side of the right wall portion 36 (i.e., as viewed in the right-left direction in which the left wall portion 34 and the right wall portion 36 face each other).

Figure 4:
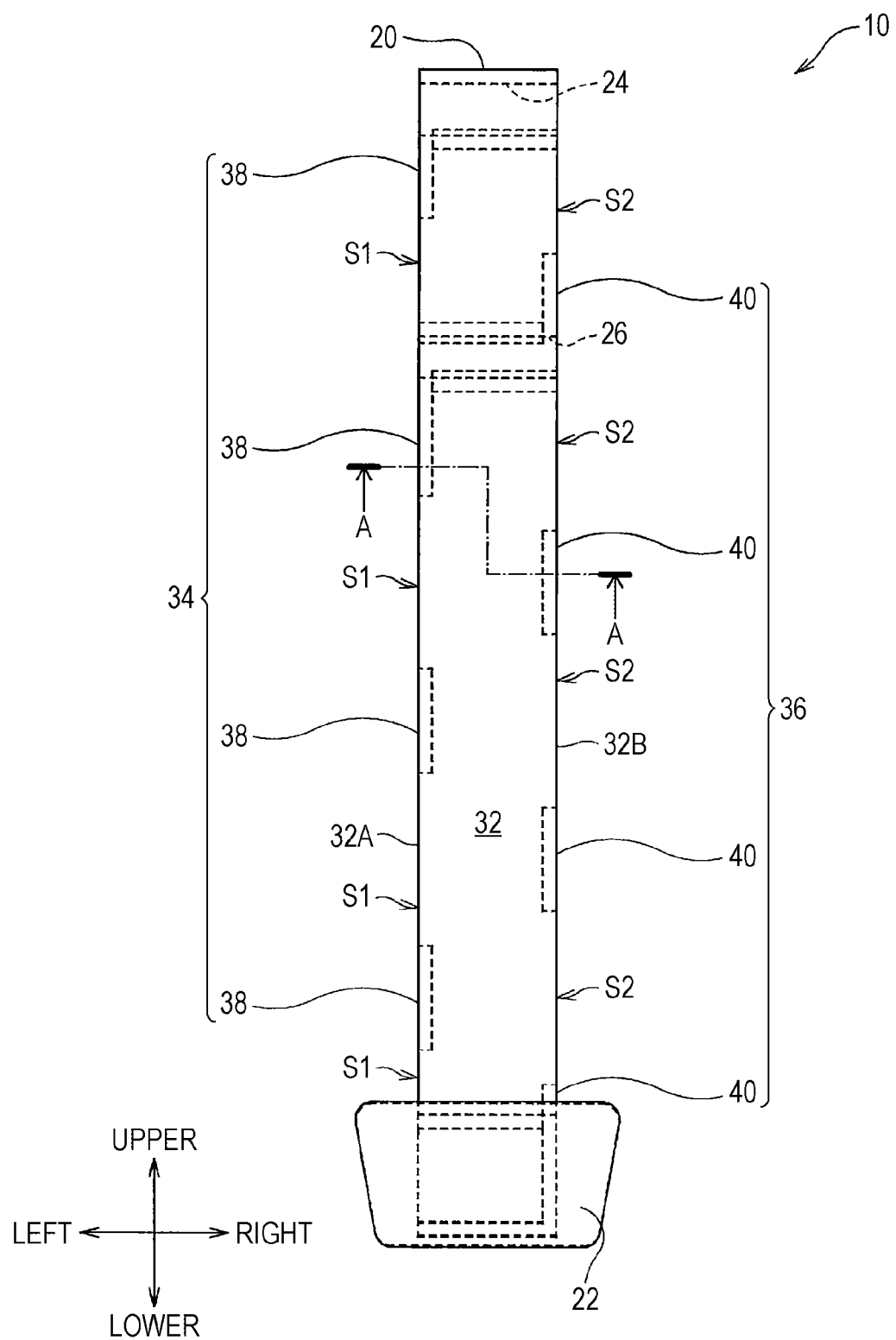
FIG. 4 is a front view of the resin pedal arm.
Figure 6:
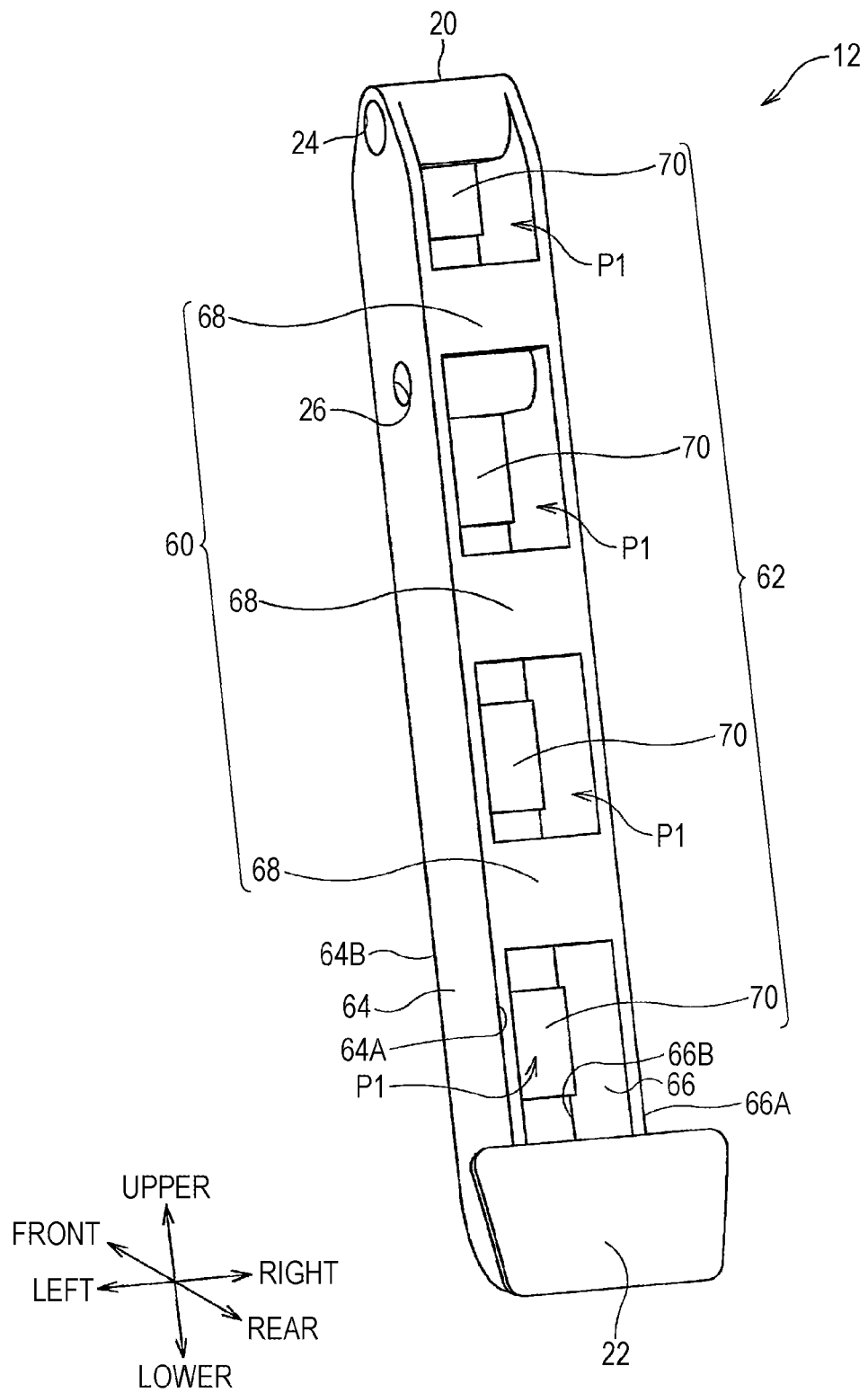
FIG. 6 is a perspective view of a resin pedal arm of a second embodiment.
Figure 7:
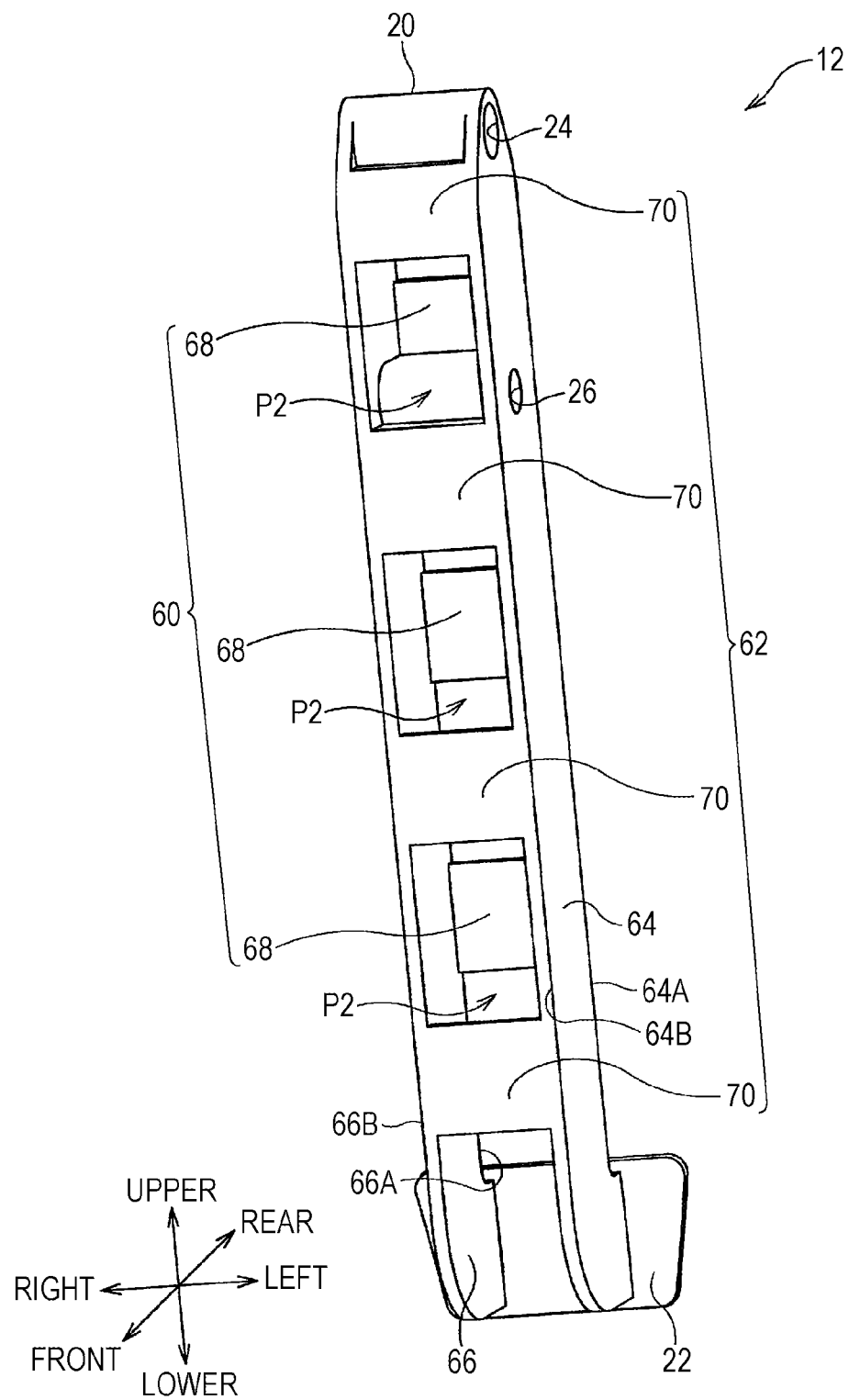
FIG. 7 is a perspective view of the resin pedal arm.

Further, the section of the arm body 20 when the resin pedal arm 10 is cut along a line A-A of FIG. 4 is a hollow rectangular section (a so-called hollow square shape) illustrated in FIG. 5.

As described above in detail, the resin pedal arm 10 of the first embodiment is manufactured by injection molding. Further, the front wall portion 30, the rear wall portion 32, the first flat plate portions 38 of the left wall portion 34, and the second flat plate portions 40 of the right wall portion 36 form the section of the arm body 20 into a shape close to the hollow rectangular section (the so-called hollow square shape) which is difficult to be shaped in injection molding. Thus, in the resin pedal arm 10 of the first embodiment, strength can be further improved.

The front wall portion 30 and the rear wall portion 32 without the left opening areas S1 and the right opening areas S2 and the tread portion 22 are parallel with the vehicle width direction of the vehicle to which the arm body 20 is attached. Thus, die cutting is facilitated in injection molding for manufacturing the resin pedal arm 10. Further, the arm body 20 of the first embodiment has a greater modulus of section for force (hereinafter referred to as "stepping force") when the driver steps on the tread portion 22 in the forward direction of the vehicle as compared to that in a later-described second embodiment. Thus, strength against the stepping force can be further improved.

Note that in the first embodiment, the front wall portion 30 is one example of a "first wall portion." The left edge 30A of the front wall portion 30 is one example of a "first edge." The right edge 30B of the front wall portion 30 is one example of a "second edge." The rear wall portion 32 is one example of a "second wall portion." The left edge 32A of the rear wall portion 32 is one example of a "first edge." The right edge 32B of the rear wall portion 32 is one example of a "second edge." The left wall portion 34 is one example of a "third wall portion." The right wall portion 36 is one example of a "fourth wall portion." The multiple left opening areas S1 are one example of "multiple opening areas each provided between adjacent ones of multiple first flat plate portions."

(2) Second Embodiment

Next, the specific second embodiment of the present embodiment will be described. Note that in description below, the same reference numerals are used to represent components substantially common to the first embodiment, and detailed description will be omitted.

As illustrated in FIGS. 6 to 9, in a resin pedal arm 12 of the second embodiment, an arm body 20 has a rear wall portion 60, a front wall portion 62, a left wall portion 64, and a right wall portion 66.

The left wall portion 64 and the right wall portion 66 face each other in the right-left direction. Thus, circular openings of each of a boss 24 and a clevis attachment hole 26 are provided at the left wall portion 64 and the right wall portion 66. Each of lower end portions of the left wall portion 64 and the right wall portion 66 is in a shape bent in the backward direction, and is continuous to a tread portion 22. On the other hand, upper end portions of the left wall portion 64 and the right wall portion 66 are continuous to each other through the boss 24.

The rear wall portion 60 includes, e.g., multiple first flat plate portions 68. The multiple first flat plate portions 68 are, between a rear edge 64A of the left wall portion 64 and a rear edge 66A of the right wall portion 66, arranged next to each other in a longitudinal direction of the arm body 20 in a state in which the multiple first flat plate portions 68 are continuous to the left wall portion 64 and the right wall portion 66. Thus, each of multiple rear opening areas P1 is formed between adjacent ones of the multiple first flat plate portions 68. Note that the lowermost rear opening area P1 of the multiple rear opening areas P1 is formed between the first flat plate portion 68 and the tread portion 22. Moreover, the uppermost rear opening area P1 is formed between the first flat plate portion 68 and the boss 24.

The front wall portion 62 includes, e.g., multiple second flat plate portions 70. The multiple second flat plate portions 70 are, between a front edge 64B of the left wall portion 64 and a front edge 66B of the right wall portion 66, arranged next to each other in the longitudinal direction of the arm body 20 in a state in which the multiple second flat plate portions 70 are continuous to the left wall portion 64 and the right wall portion 66. Thus, each of multiple front opening areas P2 is formed between adjacent ones of the multiple second flat plate portions 70.

At the rear wall portion 60 and the front wall portion 62, the multiple first flat plate portions 68 and the multiple second flat plate portions 70 are alternately arranged in the longitudinal direction of the arm body 20. The multiple second flat plate portions 70 are each present in the multiple rear opening areas P1 as viewed from the side of the rear wall portion 60 (i.e., as viewed in a front-rear direction in which the rear wall portion 60 and the front wall portion 62 face each other). On the other hand, the multiple first flat plate portions 68 are each present in the multiple front opening areas P2 as viewed from the side of the front wall portion 62 (i.e., as viewed in the front-rear direction in which the rear wall portion 60 and the front wall portion 62 face each other).

Further, the section of the arm body 20 when the resin pedal arm 12 is cut along a line B-B of FIG. 8 is a hollow rectangular section (a so-called hollow square shape) illustrated in FIG. 10.

As described above in detail, the resin pedal arm 12 of the second embodiment is manufactured by injection molding. Further, the first flat plate portions 68 of the rear wall portion 60, the second flat plate portions 70 of the front wall portion 62, the left wall portion 64, and the right wall portion 66 form the section of the arm body 20 into a shape close to the hollow rectangular section (the so-called hollow square shape) which is difficult to be shaped in injection molding. Thus, in the resin pedal arm 12 of the second embodiment, strength can be further improved.

Note that in the second embodiment, the left wall portion 64 is one example of a "first wall portion." The rear edge 64A of the left wall portion 64 is one example of a "first edge." The front edge 64B of the left wall portion 64 is one example of a "second edge." The right wall portion 66 is one example of a "second wall portion." The rear edge 66A of the right wall portion 66 is one example of a "first edge." The front edge 66B of the right wall portion 66 is one example of a "second edge." The rear wall portion 60 is one example of a "third wall portion." The front wall portion 62 is one example of a "fourth wall portion." The multiple rear opening areas P1 are one example of "multiple opening areas each provided between adjacent ones of multiple first flat plate portions."

(3) Other

Note that the present embodiment is not limited to each of the above-described embodiments, and various changes can be made without departing from the gist of the present embodiment. In description below, the same reference numerals are used to represent components substantially common to the first embodiment or the second embodiment, and detailed description will be omitted.

(3-1) First Variation

Figure 11:
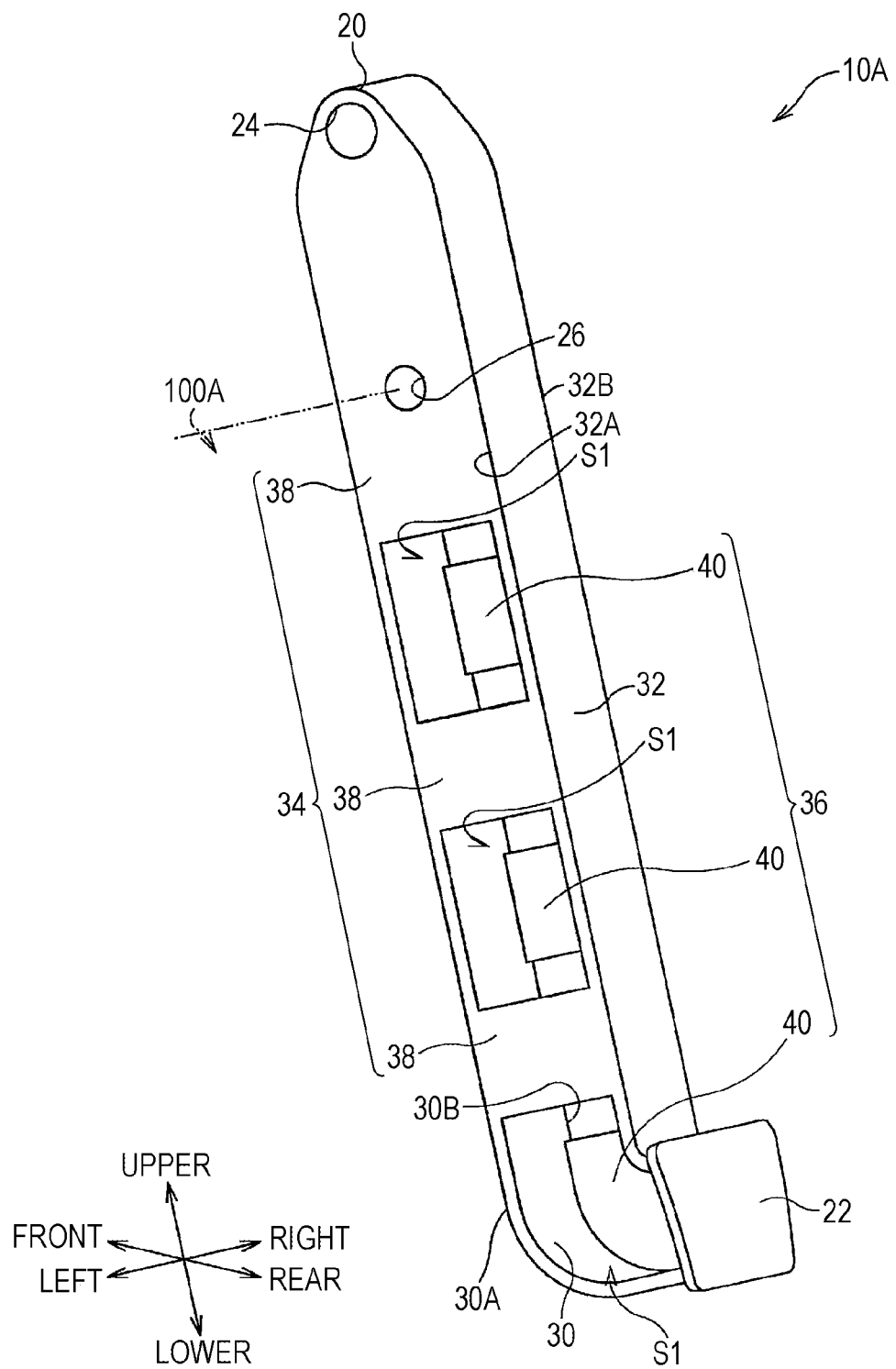
FIG. 11 is a perspective view of a variation of the resin pedal arm of the first embodiment.

In a resin pedal min 10A as a variation of the first embodiment as illustrated in FIG. 11, the multiple first flat plate portions 38 and the multiple second flat plate portions 40 are, at the arm body 20, provided in a first predetermined region 100A extending downward of the boss 24.

With the above-described configuration, the multiple first flat plate portions 38 and the multiple second flat plate portions 40 are, at the resin pedal arm 10A, provided in the first predetermined region 100A (i.e., part of the arm body 20) of the left wall portion 34 and the right wall portion 36, and therefore, the degree of freedom for limitations due to injection molding is high.

Note that the first predetermined region 100A is one example of a "predetermined region of a third wall portion and a fourth wall portion."

(3-2) Second Variation

Figure 12:
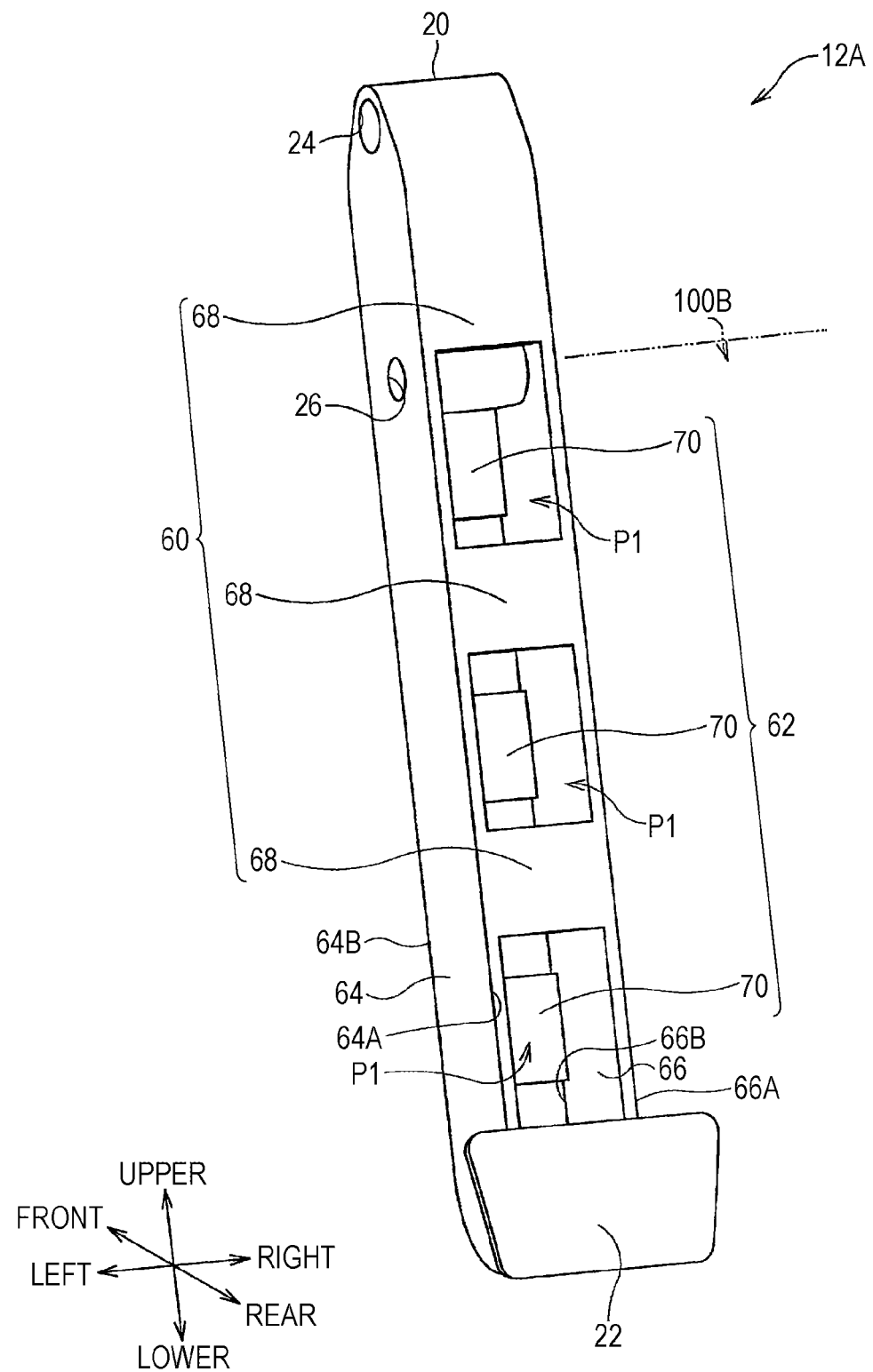
FIG. 12 is a perspective view of a variation of the resin pedal arm of the second embodiment.
Figure 13:
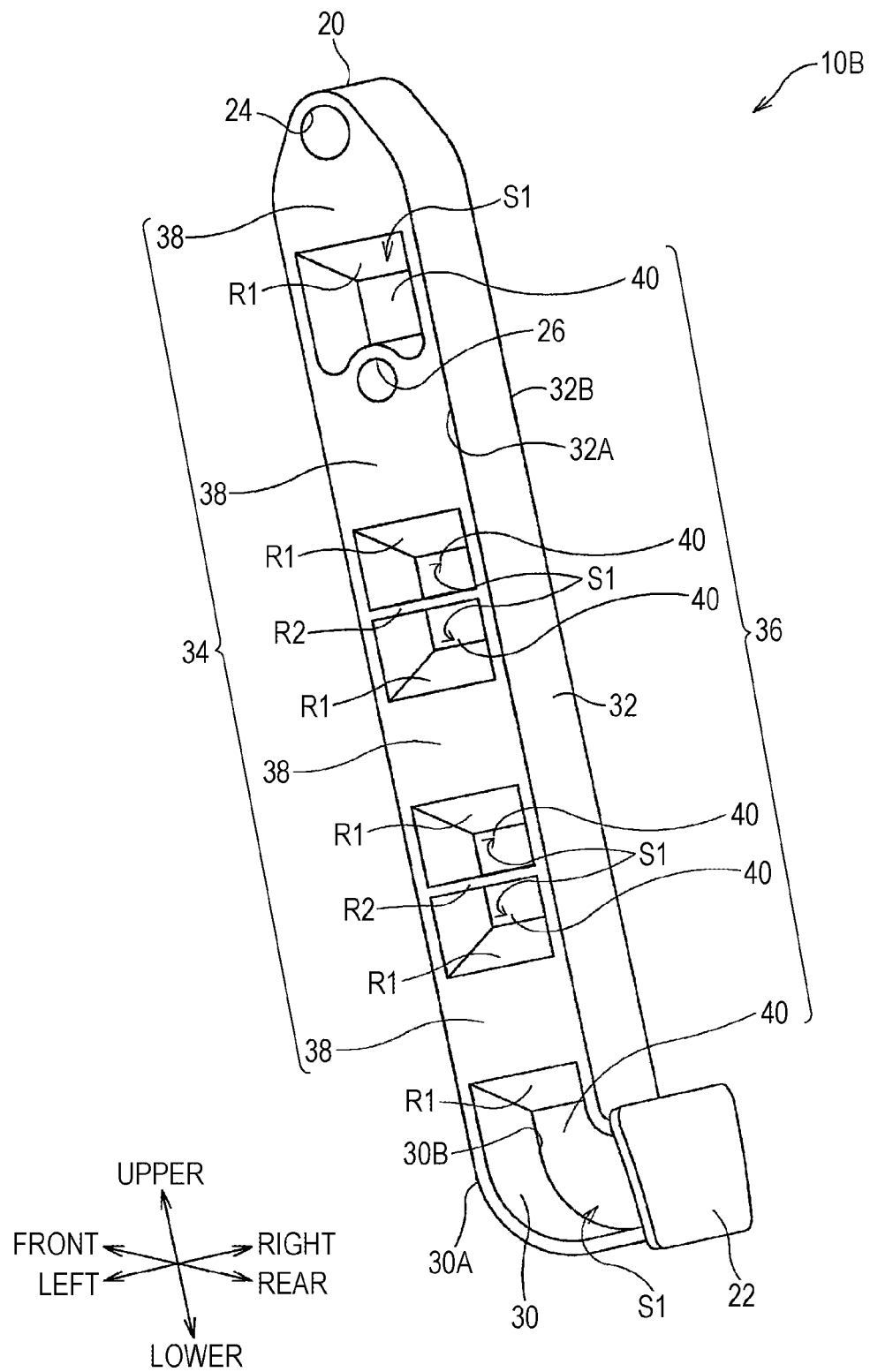
FIG. 13 is a perspective view of a variation of the resin pedal arm of the first embodiment.
Figure 14:
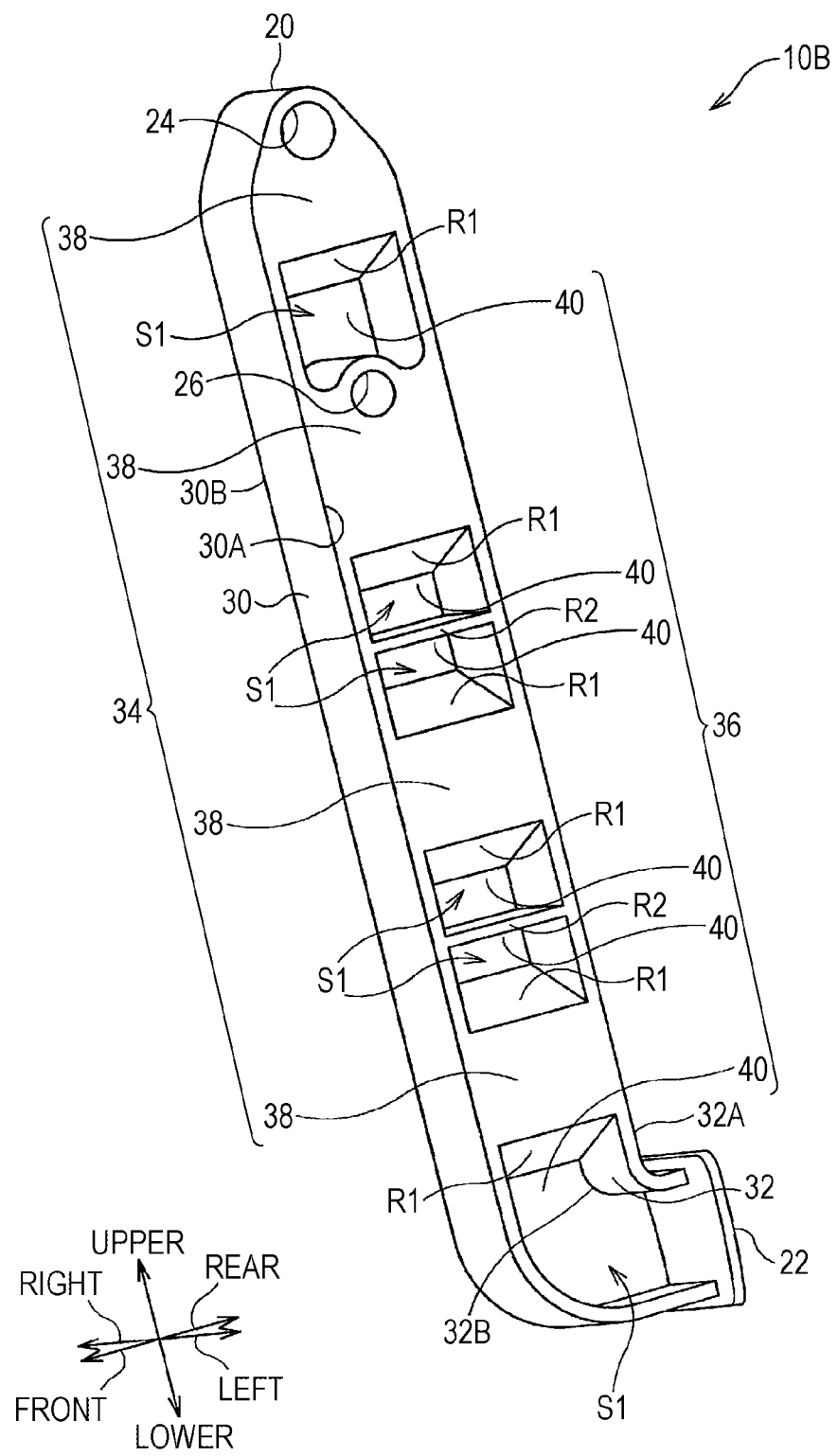
FIG. 14 is a perspective view of the resin pedal arm.

In a resin pedal arm 12A as a variation of the second embodiment as illustrated in FIG. 12, the multiple first flat plate portions 68 and the multiple second flat plate portions 70 are, at the arm body 20, provided in a second predetermined region 100B extending downward of the boss 24.

With the above-described configuration, the multiple first flat plate portions 68 and the multiple second flat plate portions 70 are, at the resin pedal arm 12A, provided in the second predetermined region 100B (i.e., part of the arm body 20) of the rear wall portion 60 and the front wall portion 62, and therefore, the degree of freedom for limitations due to injection molding is high.

Note that the second predetermined region 100B is one example of a "predetermined region of a third wall portion and a fourth wall portion."

(3-3) Third Variation

In a resin pedal arm 10B illustrated in FIGS. 13 to 17, multiple first ribs R1 and multiple second ribs R2 are provided in the first embodiment.

The multiple second ribs R2 are in a flat plate shape parallel with the right-left direction, and between the left wall portion 34 and the right wall portion 36, are provided in a state in which the second rib R2 extends from the second flat plate portion 40 to the left opening area S1 or a state in which the second rib R2 extends from the first flat plate portion 38 to the right opening area S2.

The multiple first ribs R1 are in a flat plate shape, and between the left wall portion 34 and the right wall portion 36, are provided in a state in which the first rib R1 is continuous to a lower edge of the first flat plate portion 38 and an upper edge of the second flat plate portion 40 or a state in which the first rib R1 is continuous to an upper edge of the first flat plate portion 38 and a lower edge of the second flat plate portion 40.

Thus, the first rib R1 connecting the lower edge of the first flat plate portion 38 and the upper edge of the second flat plate portion 40 is in an inclined state in which the first rib R1 extends downwardly from the first flat plate portion 38 to the second flat plate portion 40. On the other hand, the first rib R1 connecting the upper edge of the first flat plate portion 38 and the lower edge of the second flat plate portion 40 is in an inclined state in which the first rib R1 extends upwardly from the first flat plate portion 38 to the second flat plate portion 40.

With this configuration, the multiple first ribs R1 are inclined with respect to the right-left direction in which the left wall portion 34 and the right wall portion 36 face each other, and as viewed in the right-left direction, are each present in the left opening areas S1 and the right opening areas S2. Thus, the multiple first ribs R1 do not interfere with die cutting in the right-left direction in injection molding for manufacturing the resin pedal arm 10B.

Note that a front edge of each of the multiple first ribs R1 and the multiple second ribs R2 is provided continuously to the front wall portion 30. Moreover, a rear edge of each of the multiple first ribs R1 and the multiple second ribs R2 is provided continuously to the rear wall portion 32.

Figure 16:
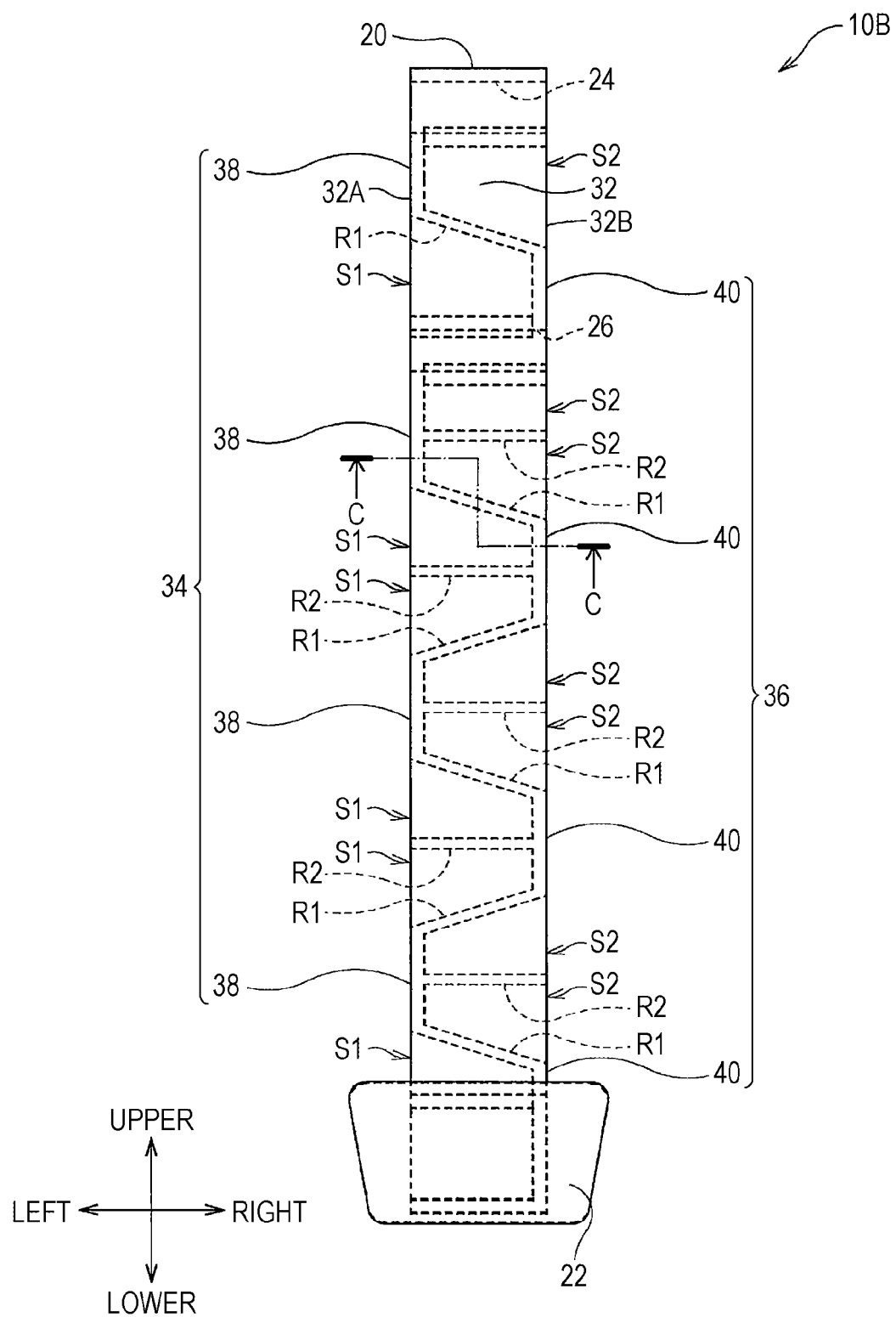
FIG. 16 is a front view of the resin pedal arm.

The section of the arm body 20 when the resin pedal arm 10B having the above-described configuration is cut along a line C-C of FIG. 16 is a hollow rectangular section (a so-called hollow square shape) illustrated in FIG. 17.

LIST OF REFERENCE NUMERALS 10, 10A, 12, 12A resin pedal arm
20 arm body
22 tread portion
30 front wall portion
30A left edge
30B right edge
32 rear wall portion
32A left edge
32B right edge
34 left wall portion
36 right wall portion
38 multiple first flat plate portions
40 multiple second flat plate portions
60 rear wall portion
62 front wall portion
64 left wall portion
64A rear edge
64B front edge
66 right wall portion
66A rear edge
66B front edge
68 multiple first flat plate portions
70 multiple second flat plate portions
S1 left opening area
S2 right opening area
P1 rear opening area
P2 front opening area
100A first predetermined region
100B second predetermined region

What is claimed is:
1. A resin pedal arm comprising:
a hollow arm body,
wherein the arm body includes
a first wall portion,
a second wall portion facing the first wall portion,
a third wall portion formed between first edges of the first wall portion and the second wall portion and having multiple first flat plate portions arranged to bridge between the first edges, and a fourth wall portion formed between second edges of the first wall portion and the second wall portion, having multiple second flat plate portions arranged to bridge between the second edges, and facing the third wall portion, and the multiple second flat plate portions are each present in multiple opening areas each provided between adjacent ones of the multiple first flat plate portions, as viewed in a direction in which the third wall portion and the fourth wall portion face each other.

2. The resin pedal arm according to claim 1, further comprising:

a tread portion provided at the arm body and stepped on in a forward direction of a vehicle to which the arm body is attached, wherein the tread portion, the first wall portion, and the second wall portion are parallel with a vehicle width direction of the vehicle.

3. The resin pedal arm according to claim 2, wherein the multiple first flat plate portions and the multiple second flat plate portions are provided in a predetermined region of the third wall portion and the fourth wall portion.

4. The resin pedal arm according to claim 1, wherein the multiple first flat plate portions and the multiple second flat plate portions are provided in a predetermined region of the third wall portion and the fourth wall portion.

* * * * *

UNITED STATES PATENT AND TRADEMARK OFFICE
CERTIFICATE OF CORRECTION

| | |
|---|---|
| PATENT NO. | : 11,262,784 B2 |
| APPLICATION NO. | : 17/277870 |
| DATED | : March 1, 2022 |
| INVENTOR(S) | : Irie et al. |

It is certified that error appears in the above-identified patent and that said Letters Patent is hereby corrected as shown below:

In the Specification

Column 3, Line 22, "resin pedal alai along a" should read -- resin pedal arm along a --

Signed and Sealed this
Twenty-third Day of August, 2022

Katherine Kelly Vidal
*Director of the United States Patent and Trademark Office*